United States Patent [19]

Larsson et al.

[11] 4,256,809

[45] Mar. 17, 1981

[54] AMBIENT OR LOW-TEMPERATURE CURABLE COATINGS FOR LEATHER AND OTHER FLEXIBLE SUBSTRATES

[75] Inventors: Bjorn E. Larsson, Rushland; Fred A. Desiderio, Cornwells Heights, both of Pa.

[73] Assignee: Rohm and Haas Company, Philadelphia, Pa.

[21] Appl. No.: 9,022

[22] Filed: Feb. 2, 1979

[51] Int. Cl.$^3$ .................................................. B32B 9/04
[52] U.S. Cl. ........................... 428/473; 260/29.6 TA; 260/29.6 H; 427/388.4; 427/389; 427/389.9; 427/393.5; 427/407.1; 427/409; 427/411; 427/412; 428/246; 428/261; 428/262; 428/286; 428/290; 428/460; 428/461; 428/512; 428/514; 428/515; 428/522; 428/528; 428/530; 428/540; 428/904; 526/219
[58] Field of Search .............. 427/389, 385 B, 412, 427/421, 429, 389.9, 388.4, 393.5, 407.1, 409, 411; 428/473, 515, 522, 540, 904, 246, 265, 262, 286, 290, 460, 461, 512, 528, 530, 514; 526/13, 16, 51, 217, 219; 260/29.6 TA, 29.6 H

[56] References Cited

U.S. PATENT DOCUMENTS

| 2,555,646 | 6/1951 | Jones ............................ 260/29.6 AT |
| 2,764,570 | 9/1956 | Kowolik et al. ................... 260/29.6 |
| 2,847,395 | 8/1958 | Wear .................................... 428/414 |
| 3,025,265 | 3/1962 | Maeder ................................ 525/329 |
| 3,251,904 | 5/1966 | Souder et al. ......................... 525/85 |
| 3,455,861 | 7/1969 | Bresciani et al. .................. 260/29.6 |
| 3,457,209 | 7/1969 | Mikofalvy ........................ 260/29.6 |
| 3,461,188 | 8/1969 | Baer .................................... 525/290 |
| 3,513,125 | 5/1970 | Kehr .................................... 528/121 |
| 3,785,848 | 1/1974 | Mattei et al. ..................... 428/904 X |
| 3,812,205 | 5/1974 | Dunkelberger ..................... 525/261 |
| 3,895,082 | 7/1975 | Hochberg ................... 204/159.16 X |
| 3,896,085 | 7/1975 | Larsson et al. ................. 427/389 X |
| 4,016,127 | 4/1977 | Larsson et al. ............. 260/29.6 TA |
| 4,049,637 | 9/1977 | Schimmel et al. .................. 528/363 |
| 4,061,822 | 12/1977 | Brodnyan et al. .................. 428/315 |
| 4,061,845 | 12/1977 | Fabris et al. ......................... 526/11.1 |
| 4,083,835 | 4/1978 | Pohlemann et al. ............. 526/51 X |
| 4,101,602 | 7/1978 | Fabris et al. ....................... 526/51 X |
| 4,103,077 | 7/1978 | O'Mahoney, Jr. ................... 526/51 |
| 4,107,120 | 8/1978 | Plamondon et al. ......... 260/29.6 RB |

FOREIGN PATENT DOCUMENTS 839377 6/1960 United Kingdom ..................... 526/51
1037131 7/1966 United Kingdom .

OTHER PUBLICATIONS

Chem. Abstract, 50: 12545 (1956).
Chem. Abstract, 60: 5663g (1964).
Chem. Abstract, 62: 1807a (1965).
Chem. Abstract, 81: 170268h (1974).

Primary Examiner—Michael R. Lusignan
Assistant Examiner—Thurman K. Page
Attorney, Agent, or Firm—Lester E. Johnson

[57] ABSTRACT

Ambient or low-temperature curable aqueous dispersions of (1) an emulsion polymer containing units polymerized from a monomer mixture of (a) from about 0.25% to about 10% by weight of a polymerizable aldehyde, (b) from about 0.5% to about 10% by weight of an ethylenically unsaturated carboxylic acid, and (c) up to about 99.25% by weight of at least one copolymerizable mono-ethylenically unsaturated monomer, with (2) a curing agent selected from the group of dicarboxylic acid bis-hydrazides and bis-hydrazones are disclosed. The dispersions are useful in leather treating compositions, especially in top coat compositions. A process for producing fully finished leather, or leather substitutes is also disclosed.

23 Claims, No Drawings

AMBIENT OR LOW-TEMPERATURE CURABLE COATINGS FOR LEATHER AND OTHER FLEXIBLE SUBSTRATES

CROSS-REFERENCE

This application is related to commonly-assigned U.S. Ser. No. 009,023 of William D. Emmons entitled AMBIENT OR LOW-TEMPERATURE CURABLE COATINGS filed Feb. 2, 1979, now U.S. Pat. No. 4,210,565.

FIELD OF THE INVENTION

This invention relates to compositions containing an aqueous emulsion polymer of polymerizable aldehydes, $\alpha,\beta$-unsaturated acids, and alkyl esters of methacrylic acid and acrylic acid and, as a curing agent therefore, dicarboxylic acid bis-hydrazides and bis-hydrazones; to treating compositions for leather and leather substitutes; to processes for treating leather and leather substitutes; and to leather, or leather substitutes, treated with the compositions described above.

DESCRIPTION OF THE PRIOR ART

U.S. Pat. No. 3,513,125 discloses the use of various hydrazides to modify and/or crosslink various polymers including ketone and aldehyde polymers. Optimally, the chosen crosslinking agent in the chosen polymer system is completely non-reactive at the blending temperature and crosslinking is generally performed at 70° C. to 300° C. The compositions disclosed have varied uses, for example coatings for wood, metal, and paper; films; molded items; caulking compositions; adhesives and the like.

U.S. Pat. No. 3,025,265 discloses polymers containing hydrazide or hydrazone functional groups, prepared by the reaction of hyrazine with polymerized units of carboxylic acids, including acrylic acid and methacrylic acid and ester or acid chloride derivatives thereof, which are crosslinkable by reaction with a relatively small molecule containing aldehyde or ketone functional groups. Examples of the crosslinking aldehydes and ketones mentioned are acrolein and polyvinyl methyl ketone. The crosslinking reactions disclosed in the patent can be accelerated by heat.

U.S. Pat. No. 3,455,861 discloses the use of an aqueous dispersion of an acrolein-acrylonitrile-ethyl acrylate terpolymer mixed with crosslinking agents including phenol-, urea-, and melamine-formaldehyde resins and hydrazine to form an elastic coating on leather.

U.S. Pat. Nos. 4,016,127 and 3,896,085 disclose emulsion polymers containing (a) from about 0.25 to 4% by weight acrolein, (b) from about 0.5 to 10% by weight of an ethylenically unsaturated carboxylic acid, and (c) up to about 99.25% by weight alkyl acrylate, alkyl methacrylate, and mixtures thereof which are curable with ammonia, polyprimary amines, and hydrazine. The compositions of the patent are useful in treating leather and particularly in base coat leather treating compositions.

The commercial finishing of leather involves the consecutive application of one or more finish coats. The first finish coat is commonly referred to as the "base coat", and is applied to leather to provide a base for good adhesion of subsequent finish coats and to cover, fill, or hide imperfections in the leather surface. After the base coat has been applied, there can be applied, optionally, a "plate coat", a "color coat", an "effect coat", or any combination of the foregoing, each of which may contain pigment resin, dye, or any combination of these. Then, a final "top coat", with or without added pigment, resin, or dye, is applied. Any one of the "coats" described above may consist of a single layer or of multiple layers.

Coatings applied to leather and other flexible substrates for protection and aesthetic effects are generally required to be soft and flexible so as not to impart stiffness to the finished product and to withstand flexing at temperatures as low as $-40°$ C. and, at the same time, to be tough enough to withstand abrasion and wear conditions and also to be dry enough to provide a finished product that is not tacky so as to avoid producing finished surfaces that stick to each other during manufacturing or under use conditions. This desired combination of properties is particularly difficult to achieve with air-dried finishes on leather when using resinous binders presently being used in top coat formulations when low flexing temperature conditions ($-40°$ C.) must be met. Resinous binders presently employed which meet this requirement are tacky at ambient temperatures (20°-40° C.). Conversely, binders which are presently employed which are hard enough to have no tack generally have poor low-temperature cold crack resistance. The use of binders based on amide-functional copolymers having a low $T_g$ which are crosslinked with aldehyde or aldehyde-functional polymers such as those disclosed in U.S. Pat. No. 4,107,120 and commonly assigned copending application U.S. Ser. No. 945,733, or aldehyde-functional copolymers crosslinked with amine functionality such as those disclosed in U.S. Pat. Nos. 4,016,127 and 3,896,085, have provided some improvement; however, leather articles containing crosslinked top coat finishes as just described have the disadvantages of displaying poor wet-crock resistance because of the hydrophilic amide component and discoloration because of the presence of the amine component. The use of hydrazine as the amine crosslinking component is undesirable because of the toxicity associated with this reagent.

SUMMARY OF THE INVENTION

It is an object of the present invention to provide compositions adapted to coat flexible substrates.

Another object is to provide improved crosslinked coatings carried on or in a flexible substrate.

A further object is to provide an improved article of manufacture comprising a flexible substrate treated with the improved crosslinked coating.

Still another object is to provide an improved process for treating a flexible substrate.

Yet another object is to provide a process for producing an improved fully-finished flexible material.

These and other objects as will become apparent are achieved by the present invention which comprises an ambient or low-temperature curable composition adapted to coat a flexible substrate, selected from the group consisting of leather and leather substitutes, comprising an aqueous dispersion of:

a. an emulsion polymer containing from about 1% to about 60% by weight resin solids polymerized from a monomer mixture comprising (1) from about 0.25% to about 10% by weight of a polymerizable aldehyde selected from the group consisting of methacrolein and acrolein, (2) from about 0.5% to about 10% by weight of at least one $\alpha,\beta$-ethylenically unsaturated carboxylic acid, and (3) up to about 99.25% by weight of at least one copolymerizable mono-ethylenically unsaturated monomer selected from the group consisting of $(C_1-C_{24})$ alkyl methacrylates, $(C_1-C_{24})$ alkyl acrylates, vinylidene halides, vinyl halides, (meth)acrylonitrile, vinyl esters, ethylene and alpha-olefins, acrylic and methacrylic acid esters of alcohol-ethers, vinyl ethers, styrene and alkyl-substituted styrenes, and vinyl aromatics, the combination of monomers being selected to provide a $T_g$ in the polymer of up to about 0° C.; and b. a curing agent comprising a member selected from the group consisting of a dicarboxylic acid bis-hydrazide represented by the formula, $H_2N$—NH—C(O)—R—C(O)—NH—$NH_2$, and a dicarboxylic acid bis-hydrazone represented by the formula $R^1R^2C=N$—NH—C(O)—R—C(O)—NH—N=$CR^1R^2$, wherein R is a member selected from the group consisting of a divalent polymethylene group having from 0 to 34 carbon atoms and a divalent aromatic ring and $R^1$ and $R^2$ are selected from the group consisting of H and alkyl groups, the amount of bis-hydrazide or bis-hydrazone being selected to provide a ratio of hydrazide or of hydrazone groups to aldehyde groups of the polymer in the dispersion of from about 1:2 to 2:1.

In a preferred embodiment the composition of the invention comprises an emulsion polymer containing from about 30% to about 60% by weight resin solids polymerized from a monomer mixture comprising (1) from about 1% to about 7.5% by weight of methacrolein (2) from about 1% to about 7% by weight of a member selected from the group consisting of acrylic acid and methacrylic acid, and (3) up to about 98% by weight of at least one monomer selected from the group consisting of $(C_1-C_{24})$ alkyl methacrylates and $(C_1-C_{24})$ alkyl acrylates, the combination of alkyl methacrylates and alkyl acrylates being selected to provide a $T_g$ in the copolymer of up to about $-10°$ C.

In a more preferred embodiment, the emulsion polymer of the composition of the invention comprises a heteropolymer containing from about 30% to about 60% by weight resin solids, the particles of which comprise (a) about 50 parts to 95 parts by weight of a first polymer having a $T_g$ of up to $-20°$ C. formed by emulsion polymerization of a first monomer mixture comprising (1) from about 0.25% to about 10% by weight of a polymerizable aldehyde selected from the group consisting of methacrolein and acrolein, (2) from about 0.5% to about 10% by weight of at least one $\alpha$ $\beta$-ethylenically unsaturated carboxylic acid, and (3) up to about 99.25% by weight of at least one copolymerizable mono-ethylenically unsaturated monomer; and (b) about 5 parts to 50 parts by weight of a second polymer having a $T_g$ of about 100° C. to about $-10°$ C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

In a most preferred embodiment of the invention, the composition of the invention comprises an emulsion polymer comprising the heteropolymer wherein the first polymer of the heteropolymer comprises units from methacrolein, an ethylenically unsaturated carboxylic acid selected from the group consisting of acrylic and methacrylic acid, and at least one monomer selected from the group consisting of $(C_1-C_{24})$ alkyl methacrylates and $(C_1-C_{24})$ alkyl acrylates, and the second polymer comprises at least one monomer selected from the group consisting of $(C_1-C_8)$ alkyl methacrylates, styrene and alkyl-substituted styrenes, and (meth)acrylonitrile, and the curing agent comprises a dicarboxylic acid bis-hydrazide represented by the formula $H_2N$—NH—C(O)—R—C(O)—NH—$NH_2$, wherein R is a divalent polymethylene group having 0 to 34 carbon atoms.

In another aspect, the present invention comprises a crosslinked coating carried on or in a flexible substrate obtained by the ambient or low-temperature curing of the composition of the invention described above.

In a further aspect, the invention comprises an article of manufacture comprising a flexible substrate, selected from the group consisting of leather and leather substitutes, treated with the ambient or low-temperature cured composition of the invention.

In still another aspect the invention comprises a process for producing an improved fully-finished flexible material selected from the group consisting of leather and a leather substitute material comprising the steps of:

a. applying to the flexible material at least one first finish coat which consists of a soft, flexible, resinous binder which may optionally contain pigment and drying the resulting first finish coated material;

b. applying to the dried first finish coated material at least one second plate or embossing coat and drying the second plating coated material;

c. applying to the dried first and second-coated material at least one third color coat comprising a film-forming acrylic polymer containing pigment dispersed therein and drying the third color coated material; and d. applying to the dried first and second and third-coated material at least one fourth top coat comprising an ambient or low-temperature curable composition comprising an aqueous dispersion of (1) an emulsion polymer having a plurality of reactive aldehyde groups and (2) a curing agent having a plurality of a member selected from the group consisting of hydrazide groups, represented by the formula $H_2N$—NH—C(O)—, and hydrazone groups, represented by the formula $R^1R^2C=N$—NH—C(O)—, wherein $R^1$ and $R^2$ are selected from the group consisting of H and alkyl groups, the ratio of hydrazide groups or of hydrazone groups to aldehyde groups of the copolymer in the dispersion being from about 1:2 to 2:1, and drying the fourth top coated material.

Examples of the $\alpha,\beta$-ethylenically unsaturated acids which can be used in forming the polymers of the invention include acrylic acid, methacrylic acid, ethacrylic acid, itaconic acid, aconitic acid, crotonic acid, citraconic acid, maleic acid, fumaric acid, $\alpha$-chloroacrylic acid, cinnamic acid, mesaconic acid, and mixtures thereof. As indicated above, acrylic acid and methacrylic acid are preferred.

Examples of the alkyl $(C_1-C_{24})$alkyl groups of the esters of methacrylic acid and acrylic acid which can be used in forming the polymers used in the invention include methyl, ethyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl, stearyl groups, and the like. In forming the random polymerized emulsion polymer and the first polymer of the emulsion heteropolymer used in the invention, butyl acrylate is especially preferred alone or in combination with minor amounts of methyl methacrylate. In forming the higher $T_g$ second polymer when the emulsion polymer comprises a heteropolymer, methylmethacrylate is preferred in major amounts.

While acrylates and methacrylates are preferred, other mono-ethylenically unsaturated polymerizable monomers useful in the invention are vinylidene halides, vinyl halides, (meth)acrylonitrile, vinyl esters such as vinyl formate, vinyl acetate and vinyl propionate, and mixtures of ethylene and such vinyl esters, acrylic and methacrylic acid esters of alcohol-ethers such as diethylene glycol monoethyl or monobutyl ether, styrene and alkyl substituted sytrenes and vinyl aromatics, mixtures of ethylene with other alpha-olefins such as propylene, butylene, pentene, and the like, and combinations of ethylene with vinyl ethers such as methylvinyl ether, ethylvinyl ether, vinyl 2-methoxyethyl ether, vinyl 2-chloroethyl ether and the like.

The polymers of the invention can be prepared by conventional emulsion polymerization techniques. The emulsifiers or dispersing agents employed for preparing the monomer emulsions or polymer emulsions may be of the anionic, cationic or nonionic type. Also a mixture of nonionic type with either anionic or cationic types may be used.

Suitable anionic dispersing agents include for example the higher fatty alcohol sulfates, such as sodium lauryl sulfate, and the like, alkylaryl sulfonates such as sodium or potassium isopropylbenzene sulfonates or isopropyl naphthalene sulfonates, and the like; alkali metal higher alkyl sulfosuccinates, such as, sodium octyl sulfosuccinate, sodium N-methyl, N-palmitoyltaurate, sodium oleyl isothionate and the like, and alkyl metal salts of alkylarylpolyethoxyethanol sulfates or sulfonates, such as sodium tert-octylphenoxypolyethoxyethyl sulfate having 1 to 5 oxyethylene units and the like.

Suitable cationic dispersion agents include laurylpyridinium chlorides, cetyldimethyl amine acetate, and alkyldimethylbenzylammonium chlorides in which the alkyl group has from 8 to 18 carbon atoms.

Suitable non-ionic dispersing agents include alkylphenoxypolyethoxyethanols having alkyl groups of from about 7 to about 18 carbon atoms and from about 6 to about 60 oxyethylene units such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analagous ethylene oxide condensates of long-chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecyl amine, hexadecyl amine, and octadecyl amine, containing from 6 to 60 oxyethylene units; block copolymers of ethylene oxide and propylene oxide comprising a hydrophobic propylene oxide section combined with one or more hydrophilic ethylene oxide sections.

The polymerizable emulsions can be prepared at a temperature in the range of from about 0° C. to about 100° C., but intermediate temperatures are generally preferred. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides, such as t-butyl hydroperoxide and cumene hydroperoxide, and esters such as t-butyl perbenzoate. Other reducing agents include water soluble thiosulfates, hydrosulfites, tertiary amines, such as triethanolamine and the like, thiourea, and salts of metals such as the sulfate salts of metals capable of existing in more than one valent state such as cobalt, iron, nickel, and copper.

The most convenient process of preparing the dispersions of polymers comprises agitating an aqueous suspension or emulsion of the mixture of copolymerizable monomers and redox catalytic combination at room temperature without the application of external heat. The amount of catalyst can vary but the usual range is from 0.01 to 3% of the peroxidic and the same or lower proportions of the reducing agent based on the weight of the monomer. In this way, it is possible to prepare dispersions which contain as little as 1% and as much as 60% or even more of the resinous polymers on a weight basis. It is more practical and preferred to produce dispersions which contain from about 30% to about 60%, more perferably to about 50%, resin solids.

If desired, a chain-transfer agent can be used to moderate the molecular weight of the polymer obtained by the emulsion polymerization procedure in proportion to the amount of chain-transfer agents used. Examples of useful chain-transfer agents are any one of the following: long-chain alkyl mercaptans such as t-dodecyl mercaptan, alcohols such as isopropanol, isobutanol, lauryl alcohol, or t-octyl alcohol, carbon tetrachloride, tetrachloroethylene and trichlorobromoethane. Generally from about 0 to about 3% by weight, based on the weight of monomer mixture, of the chain-transfer agent can be used.

The foregoing aspects of emulsion polymerization to provide aldehyde-functional emulsion polymers are well known as described in U.S. Pat. Nos. 4,016,127 and 3,896,085. The disclosure of these patents is incorporated herein by reference.

As mentioned hereinabove, the more preferred emulsion polymer used in the invention comprises a two-stage heteropolymer. The combination of monomers which constitute the first and second monomer mixtures used to form the first polymer and the second polymer, respectively, are selected to provide a product heteropolymer having the glass transition temperature ($T_g$) characteristics of a random copolymer having a $T_g$ of up to about 0° C., preferably up to about $-10°$ C. The monomers of the first monomer mixture forming the first polymer may be the same as the monomers of the second monomer mixture forming the second polymer or may be different, provided the $T_g$ of the first polymer is up to about $-20°$ C. and the $T_g$ of the second polymer is about 100° C. to about $-10°$ C. The $T_g$ of the first polymer appears to be more critical than that of the second polymer in order to obtain a product heteropolymer having the $T_g$ characteristics of a random copolymer having a $T_g$ of up to about 0° C., preferably up to about −10° C.

The $T_g$ of the first polymer composition and second polymer composition are determinable in a known manner either experimentally or by calculation. The method of calculating the $T_g$ based upon the $T_g$ of homopolymers of individual monomers is described by Fox, Bull. Am. Physics. Soc. 1, 3, p. 123 (1956).

Monomers may be selected to obtain the appropriate $T_g$ through use of the "Rohm and Haas Acrylic Glass Temperature Analyzer", publication CM-24L/cb of Rohm and Haas Company, Philadelphia, PA.

The heteropolymer compositions are prepared by emulsion polymerization techniques based upon a 2-stage polymerization and gradual addition, preferably, of the monomer emulsions in each of the two stages. While it is advantageous to initiate and catalyze the reaction in each stage in a conventional manner, wherein the initiator is activated either thermally or by a redox reaction, thermal initiation is preferred from the standpoint of better storage stability of the resulting polymer emulsion and balance of properties as a leather treating resin. The latex particle size should be relatively small, of the order of about 300 nm or less, preferably about 100–200 nm. As is well known, given the same polymer backbone, particle size is controlled primarily by the type and level of emulsifier used in each stage of the emulsion polymerization. Molecular weight of the heteropolymers generally is of the order of about 70,000 to 2,000,000 preferably about 250,000 to 1,000,000.

The foregoing and other aspects of two-stage heteropolymer emulsion polymerization are well-known as described, for example, in U.S. Pat. Nos. 3,812,205; 3,895,082; 3,461,188; 3,457,209 and 3,251,904 except for the critical monomer selection described herein.

Heteropolymer compositions which are useful in the invention may also be prepared according to methods described in commonly assigned Ser. No. 876,285, filed Feb. 9, 1978, now U.S. Pat. No. 4,150,005 issued Apr. 17, 1979, and in Ser. No. 778,819, filed Mar. 17, 1977, now-abandoned, the former being a continuation-in-part of the latter.

The curing agent used in the invention is a member selected from the group of dicarboxylic acid bis-hydrazides represented by the formula, $H_2N$—NH—C(O)—R—C(O)—NH—$NH_2$, and a dicarboxylic acid bis-hydrazone represented by the formula, $R^1R^2C$=N—NH—C(O)—R—C(O)—NH—$CR^1R^2$, wherein R is a member selected from the group consisting of a divalent polymethylene group having from 0 to 34 carbon atoms and a divalent aromatic ring and $R^1$ and $R^2$ are selected from the group consisting of H and alkyl groups. Preferably, the curing agent is a bis-hydrazide such as adipic bis-hydrazide, azelaic bis-hydrazide, dimer acid bis-hydrazide wherein R=$C_{34}H_{62}$, terephthalic acid bis-hydrazide and isophthalic acid bis-hydrazide. More preferably, the curing agent is a bis-hydrazide wherein R is the divalent polymethylene group defined above. Most preferably the curing agent is adipic acid bis-hydrazide. The terms "bis-hydrazide" and "dihydrazide" are used synonymously.

One or more of the base coat, color coat, plating coat, or top coat compositions used in treating leather can contain pigment and any of the other auxiliaries commonly used in leather treatment compositions including defoamers, plate release aids, fillers, dulling agents, leveling agents, thickening agents, preservatives, stabilizers, anti-oxidants, anti-ozonants, and the like.

The compositions of the invention give top coat compositions having several advantages over the various prior art top coat compositions for treating leather and leather substitues. First, the compositions of the invention can be cured at ambient conditions or at low temperature which results in energy savings. Leather is temperature sensitive and may be damaged or destroyed by prolonged heating or exposure to high temperature. The compositions of the invention avoid this potential deleterious effect on the properties of the leather treated. Also, the compositions of the invention permit the treatment of leather and leather substitutes without the use of toxic or otherwise undesirable curing agents.

Leather coated with the top coat compositions of the invention also has improved properties. Among these improved properties are enhanced abrasion resistance, enhanced wet-crock resistance, improved flexibility, and reduced surface tack.

The compositions of the invention can also be used in forming films; coatings for paper, textiles, wood, plastics, metal, and the like; and as binders for non-woven fabrics, adhesives, and the like.

The following examples serve to further illustrate the invention but are not intended to limit it in any way. All parts and percentages are by weight and all temperatures are in degrees centigrade, unless otherwise indicated.

The following list defines abbreviations used in the examples:

| | |
|---|---|
| BA | -butyl acrylate |
| MMA | -methyl methacrylate |
| ALMA | -allyl methacrylate |
| AN | -acrylonitrile |
| MACO | -methacrolein |
| AA | -acrylic acid |
| t-BHP | -t-butyl hydroperoxide |
| MAA | -methacrylic acid |
| TMPTMA | -trimethylol propane trimethacrylate |
| 2-EHA | -2-Ethylhexyl Acrylate |
| St | -styrene |
| ACO | -acrolein |

EXAMPLE 1

The following example illustrates a typical preparation of a random copolymer BA/MMA/MAA=75/20/5, used in the base coat and color coat formulations for treating leather.

A monomer emulsion containing the following materials is prepared:

| Ingredient | Amount |
|---|---|
| Water | 600 ml |
| Sodium dodecylbenzene sulfonate | 12 g |
| BA | 900 g |
| MMA | 240 g |
| MAA | 60 g |

Into a 5 l., four-neck round bottom flask equipped with a stirring means, themometer and reflux condenser, are charged 1100 ml of water and 100 g. of the monomer emulsion described above. The flask is then flushed with nitrogen and after heating to about 80°–85° C. for about 30 minutes, a solution of 3 g. of sodium persulfate in 50 g. of water is added. After 10 minutes, gradual addition of the remainder of the monomer emulsion is begun while maintaining the temperature at about 80°–85° C. A catalyst co-feed of 3 g. of sodium persulfate in 100 ml. of water is added during the course of the addition of the remainder of the monomer emulsion. Addition is completed after about 3 hours and the resulting emulsion is heated at 80°–85° C. for an additional 40 minutes. After cooling to 50°–60° C., there is added a chaser catalyst mixture of 1 g. of t-BHP in 2 ml. of water, 10 ml. of a 0.15% solution of ferrous sulfate hepta hydrate in water, and 0.6 g. of sodium sulfoxylate formaldehyde in 20 ml. of water. After holding for an additional 30 minutes, the reaction mixture is filtered through cheesecloth to give the emulsion product.

EXAMPLE 2

The following example illustrates a typical preparation of an emulsion heteropolymer, 80(BA/MAA=95/5)//20 MMA, used in base coat and color coat formulations for treating leather.

A monomer emulsion containing the following materials is prepared:

| Ingredient | Amount |
|---|---|
| Water | 60 ml. |
| Sodium dodecylbenzene sulfonate | 2 g. |
| BA | 1140 g. |
| MAA | 60 g. |

Into a 5 l., four-neck round bottom flask equipped with a stirring means, themometer, and reflux condenser and nitrogen inlet are charged 1100 ml. of water, 100 g. of the monomer emulsion described above, and 10 g. of sodium dodecylbenzene sulfonate. The flask is then flushed with nitrogen and after heating to about 80° C., a solution of 3 g. of sodium persulfate in 50 ml. of water is added. After 10 minutes, gradual addition of the remainder of the monomer emulsion is begun while keeping the temperature at about 80° to 85° C. A catalyst co-feed of 3 g. of sodium persulfate in 100 ml. of water is added along with the remainder of the monomer emulsion. Addition is completed after 3 hours, and the emulsion is heated at 80°–85° C. for an additional 40 minutes. After cooling to 50°–60° C., there is added a chaser catalyst mixture of 1 g. of t-BHP in 2 ml. of water, 10 ml. of 0.15% ferrous sulfate heptahydrate solution, and 0.6 g. of sodium sulfoxylate formaldehyde in 20 ml. of water. The reaction mixture is stirred an additional 30 minutes, cooled, and then filtered through cheesecloth to give the emulsion product.

Into a 1 l., four-neck round bottom flask equipped with a stirring means, condenser, thermometer, and nitrogen inlet, there is charged 500 g. of the emulsion produced above (38.5% solids). The flask is then flushed with nitrogen and held at room temperature for 30 minutes. There is then charged a monomer emulsion of 0.23 g. of sodium dodecylbenzene sulfonate, 46 g. of water, and 48 g. of MMA. The resulting mixture is stirred for one hour at ambient temperature and then heated to 50° C. There is then charged to the flask a catalyst mixture of a solution of 0.12 g. of sodium persulfate in 9 ml. of water, 0.05 g. of sodium sulfoxylated formaldehyde in 5 ml. of water, and 1 ml. of a 0.15% solution of ferrous sulfate heptahydrate in water. The polymerization exotherm causes the temperature to increase to 60° C. After 15 minutes, there is charged a catalyst chaser of 0.1 g. of t-BHP in 2 ml. of water and 0.05 g. of sodium sulfoxylated formaldehyde in 5 ml. of water. After 15 minutes, the reaction mixture is cooled and then filtered through cheesecloth to give the emulsion heteropolymer product having 39.0% solids.

EXAMPLE 3

By following substantially the procedure described in Example 1 or Example 2, heteropolymer dispersions useful in basecoat, plate coat and color coat formulations are prepared from monomer emulsions having the following weight ratios of monomers:

a. 70(BA/MMA/MAA=80/15/5)//30 (BA/MMA=25/75).
b. 80(BA/MAA/TMPTMA=94.5/5/0.5)//20 MMA.
c. 80(BA/MAA/ALMA=94.8/5/0.2)//20 MMA.
d. 70(2-EHA/AM/MAA=85/10/5)//30 St.
e. 80(BA/MMA/MAA=85/10/5)//20(St-/AN=75/25).

EXAMPLE 4

By following substantially the procedure described in Example 1, aldehyde-functional copolymer dispersions useful in top coat and base coat formulations for treating leather are prepared from monomer emulsions having the following weight ratios of monomers:

a. BA/MMA/MACO/MAA=75/15/5/5.
b. EA/AN/ACO/AA=87/11/1/1.

EXAMPLE 5

This example illustrates a typical preparation of an aldehyde-functional emulsion heteropolymer, 70(BA/MMA/MACO/MAA=75/15/5/5)//30 MMA, useful in top coat and base coat formulations for treating leather.

A monomer emulsion containing the following materials is prepared:

| Ingredient | Amount |
|---|---|
| Sodium dodecylbenzene sulfonate | 12 g. |
| water | 600 ml. |
| BA | 900 g. |
| MMA | 180 g. |
| MACO | 60 g. |
| MAA | 60 g. |

Into a 5 l., four-neck round bottom flask equipped with a stirring means, thermometer, condenser, and nitrogen inlet, are charged 1100 ml. of water and 100 g. of the monomer emulsion described above. The flask is then flushed with nitrogen and after heating to about 80°–85° C. for 30 minutes, a solution of 3 g. of sodium persulfate in 50 ml. of water is added. After 10 minutes, gradual addition of the remainder of the monomer emulsion and a catalyst co-feed of 3 g. of sodium persulfate in 100 ml. of water is begun while maintaining the temperature at about 80°–85° C. Addition is completed after 3 hours, and the emulsion is heated at 80°–85° C. for an additional 40 minutes. After cooling to 50°–60° C., a chaser catalyst mixture of 1 g. of t-BHP in 2 ml. of water, 10 ml. of a 0.15% ferric sulfate heptahydate solution, and 0.6 g. of sodium sulfoxylate formaldehyde in 20 ml. of water is added. After cooling to 30° C., the reaction mixture is filtered through cheesecloth to give the emulsion polymer product having 38.5% solids and particle size of 150 nm.

400 g. of the emulsion from above is charged into a 1 l., four-neck round bottom flask equipped with a stirring means, condenser, thermometer, and nitrogen inlet. After flushing with nitrogen at room temperature for 30 minutes, a monomer emulsion of 0.33 g. of sodium dodecylbenzene sulfonate, 50 ml. of water, and 66 g. of MMA is added with stirring. The resulting mixture is stirred for 1 hour at ambient temperature and then the mixture is heated to 50° C. Then, a redox catalyst mixture of 0.15 g. of sodium persulfate in 10 ml. of water and 0.05 g. sodium hydrogen sulfite in 10 ml. of water is added. The polymerization exotherm causes the temperature of the mixture to increase to 60° C. After 15 minutes, there is charged a chaser catalyst mixture of 0.1 g. of t-BHP in 2 ml. of water and 0.07 g. of sodium sulfoxylate formaldehyde in 5 ml. of water. After 15 minutes, the reaction mixture is cooled to 30° C. and then filtered through cheesecloth to give the emulsion heteropolymer product having 40% solids.

A thin air-dried film of the heteropolymer emulsion on glass is clear and tack-free whereas the first stage emulsion polymer gives a very tacky film.

EXAMPLE 6

This example illustrates another typical preparation of an emulsion heteropolymer, 80(BA/MACO/MAA=90/5/5)//20 MMA, useful in top and base coat formulations for treating leather.

Substantially the same procedure is used in this example as is used in example 5 above except that (1) of the 12 g. of sodium dodecylbenzene sulfonate emulsifier used in the first-stage polymerization of example 5, herein 2 g. of the emulsifier is incorporated in the first-stage monomer emulsion and 10 g. of the emulsifier is incorporated in the first-stage initial charge; (2) an additional 180 g. of BA is substituted for the MMA of example 5; and (3) in the second stage polymerization of MMA, 500 g. of the first stage emulsion polymer is used and the amount of MMA is decreased to 48 g.

The emulsion heteropolymer product thereby obtained has 37% solids and a particle size of 90 nm.

EXAMPLE 7

By following substantially the procedure described in Example 5 or Example 6, heteropolymer dispersions useful in top coat formulations for treating leather are prepared from monomer emulsions having the following weight ratios of monomers:

a. 80(BA/MACO/MMA/MAA=80/2.4/12.6/5)//20 MMA.
b. 80(BA/MMA/ACO/MAA=80/13/2/5)//20 (BA/MMA=25/75).
c. 80(BA/MACO/MMA/MAA=80/2.4/12.6/5)//20 (MMA/MACO=95/5.
d. 20 MMA//80 (BA/MMA/MACO/MAA=80/12.6/2.4/5)
e. 50 (BA/MMA/MACO/AA=90/2.6/2.4/5)//50 (BA/MMA/MACO/MAA=38/54.6/2.4/5)

A typical finishing sequence for leather substrates involves the application to a leather material of at least one base coat of a soft compounded binder, the base coated leather being dried between each successive application. The compounded binder may be applied by conventional techniques, such as by spraying or brushing, to the grain side of the leather. This basecoat acts as a tiecoat and should be soft so as not to detract from the natural leather temper and yet be durable enough to withstand manufacturing conditions and to support harder wear layers applied thereto. Additional color and effects are added by applying to the base coated leather material subsequent coats, which are commonly referred to as plate coats, color coats and effect coats. Ultimate wear properties are added to the leather material by at least one final top coat which, for demanding applications such as for use in upholstery leathers, benefit from crosslinking.

Typical formulations for the various coats described above are as follows:

| A. Base Coat Formulation | |
|---|---|
| Ingredient | Wt. Percent |
| Water | 30.2 |
| Thickening agent | 1.3 |
| Aqua ammonia | 0.6 |
| Isopropanol | 1.5 |
| Clay filler | 5.0 |
| Soft wax emulsion | 5.5 |
| Leveling agent | 1.9 |
| Pigment | 23.6 |
| Acrylic resin emulsion | 30.4 |
| B. Color Coat Formulation | |
| Ingredient | Wt. Percent |
| Water | 23.2 |
| Aqua ammonia | 0.8 |
| Acrylic resin emulsion | 47.3 |
| Butyl cellosolve acetate | 14.3 |
| Anionic dispersant | 0.2 |
| Silica dulling agent | 4.7 |
| Pigment | 9.5 |
| C. Top Coat Formulation | |
| Ingredient | Wt. Percent |
| Acrylic resin emulsion | 35.8 |
| Sodium hydroxide (10% in water) | 3.6 |
| Adipic dihydrazide (5% in water) | 17.7 |
| Anionic dispersant | 0.2 |
| Butyl cellosolve acetate | 9.2 |
| Silicone dispersion | 2.5 |
| Silica dulling agent | 27.2 |
| Organic coalescent | 2.8 |
| Organo-tin catalyst | 1.0 |

EXAMPLE 8

This example illustrates the production of fully finished leather according to the invention.

Two base coats according to Formulation A, wherein the acrylic resin emulsion used is the emulsion copolymer of Example 1, are applied to leather in succession, the coated leather being dried after the application of each of the coats. Then, a color coat according to Formulation B, wherein the acrylic resin emulsion is the emulsion copolymer of Example 1, is applied to the base coated leather from above and this coated leather is dried. To the color coated leather from above is applied a top coat according to Formulation C wherein the acrylic resin emulsion is the aldehyde-functional emulsion copolymer of Example 4a, the top coat formulation containing 1 equivalent of adipic bis-hydrazide for covalent crosslinking. The resulting fully finished leather is air-dried and allowed to cure at ambient temperature for 3 days. The physical properties of this fully-treated leather are summarized in Table I below.

EXAMPLE 9

This example illustrates, in another embodiment, the production of fully finished leather according to the invention.

Two base coats according to Formulation A, wherein the acrylic emulsion copolymer is the polymer of Example 2, are applied to the leather in succession, the coated leather being dried after each application. Then, a color coat according to Formulation B, wherein the acrylic resin emulsion is the polymer of Example 2, is applied to the base coated leather and the color coated leather is dried. To this color coated leather is applied a top coat according to Formulation C, wherein the acrylic resin emulsion is the emulsion polymer of Example 4a, the top coat formulation containing 1 equivalent of adipic bis-hydrazide for covalent crosslinking. The resulting top coated leather is air-dried and allowed to cure at ambient temperature for 3 days. The physical properties of this fully finished leather are summarized in Table I below.

EXAMPLE 10

This example illustrates, in another embodiment, the production of a fully finished leather material according to the invention.

Two base coats according to Formulation A, wherein the acrylic resin emulsion is the emulsion heteropolymer of Example 2, are applied to leather in succession, the coated leather being dried after each application. Then, one color coat according to Formulation B, wherein the acrylic resin emulsion is the heteropolymer emulsion of Example 2, is applied to the base coated leather and the resulting color coated leather is dried. To this color coated leather is applied a top coat according to Formulation C, wherein the acrylic resin emulsion is the aldehyde-functional heteropolymer emulsion of Example 6, the top coat formulation containing one equivalent of adipic bis-hydrazide per equivalent of aldehyde for covalent crosslinking. The resulting top coated leather is air-dried and allowed to cure at ambient temperature for 3 days. The physical properties of the resulting fully finished leather material are summarized in Table I below.

EXAMPLE 11

Example 10 is repeated except that, in the top coat, the aldehyde-functionl emulsion heteropolymer of Example 7a is substituted for that of Example 6 in Formulation C.

EXAMPLE 12

Example 11 is repeated except that, in the color coat, a blend of the emulsion heteropolymer of Example 2 and the aldehyde-functional emulsion heteropolymer of Example 7a, in a 1:1 weight ratio, is substituted for the emulsion heteropolymer of Example 2 alone in Formulation B, the color coat formulation containing one equivalent of adipic bis-hydrazide per equivalent of aldehyde for covalent crosslinking.

EXAMPLE 13

Example 11 is repeated except that, in the base coat and color coat, respectively, the aldehyde-functional emulsion heteropolymer of Example 6 is substituted for the emulsion heteropolymer of Example 2 in Formulations A and B, respectively, the base and color coat formulation containing one equivalent of adipic bis-hydrazide per equivalent of aldehyde for covalent crosslinking.

EXAMPLE 14

Example 11 is repeated except that, in the base coat and color coat, respectively, a blend of the emulsion heteropolymer of Example 2 and the aldehyde-functional emulsion heteropolymer of Example 7a, in a 1:1 weight ratio, is substituted for the emulsion heteropolymer of Example 2 alone in Formulations A and B, respectively, the base and color coat formulation containing one equivalent of adipic bis-hydrazide per equivalent of aldehyde for covalent crosslinking.

EXAMPLE 15

Example 11 is repeated except that, in the base coat, a blend of the emulsion heteropolymer of Example 2 and the aldehyde-functional emulsion heteropolymer of Example 7a in a 1:1 weight ratio, is substituted for the emulsion heteropolymer of Example 2 alone in Formulation A, the base coat formulation containing one equivalent of adipic bis-hydrazide per equivalent of aldehyde.

TABLE I

| | Physical Properties of Fully Finished Leather* | | | | | |
|---|---|---|---|---|---|---|
| Example | Gruel Cold Flex, °F., (ASTM D1912-69) | Newark Flex (ASTM D2097-69) | Wyzenbeek Welt Rub (Fisher Body TM-31-27) | Taber Abrasion (Ford BN8-2) | Wet $A^2TC^2$ (Model CM-5) | Surface Tack |
| 8 | −40 | slight cracks | <100 cycles | severe damage | 100 cycles | slight |
| 9 | −40 | no cracks | 100 cycles | moderate damage | 100 cycles | trace |
| 10 | −40 | slight cracks | >100 cycles | moderate damage | >100 cycles | none |

*The formulations were applied to commercially available Full Grain Automotive Upholstery Crust

What is claimed is:
1. An ambient or low-temperature curable composition adapted to coat a flexible substrate, selected from the group consisting of leather and leather substitutes, comprising an aqueous dispersion of:
   a. an emulsion polymer containing from about 1% to about 60% by weight resin solids polymerized from a monomer mixture comprising (1) from about 0.25% to about 10% by weight of a polymerizable aldehyde selected from the group consisting of methacrolein and acrolein, (2) from about 0.5% to about 10% by weight of at least one α β-ethylenically unsaturated carboxylic acid, and (3) up to about 99.25% by weight of at least one copolymerizable mono-ethylenically unsaturated monomer selected from the group consisting of ($C_1$-$C_{24}$) alkyl methacrylate, ($C_1$-$C_{24}$) alkyl acrylates, vinylidene halides, vinyl halides, (meth)acrylonitrile, vinyl esters, ethylene and alpha-olefins, acrylic and methacrylic acid esters of alcoholethers, vinyl ethers, styrene and alkyl-substituted styrenes and vinyl aromatics, the combination of monomers being selected to provide a $T_g$ in the polymer of up to about 0° C.; and b. a curing agent comprising a member selected from the group consisting of a dicarboxylic acid bis-hydrazide represented by the formula, $H_2N—NH—C(O)—R—C(O)—NH—NH_2$, and a dicarboxylic acid bis-hydrazone represented by the formula $R^1R^2C=N—NH—C(O)—R—C(O)—NH—N=CR^1R^2$, wherein R is a member selected from the group consisting of a divalent polymethylene group having from 0 to 34 carbon atoms and a divalent aromatic ring and $R^1$ and $R^2$ are selected from the group consisting of H and alkyl groups, the amount of bis-hydrazide or bis-hydrazone being selected to provide a ratio of hydrazide or of hydrazone groups to aldehyde groups of the polymer in the dispersion of from about 1:2 to 2:1.

2. The composition of claim 1 wherein the emulsion polymer contains from about 30% to about 60% by weight resin solids and is polymerized from a monomer mixture comprising (1) from about 1% to about 7.5% by weight of methacrolein (2) from about 1% to about 7% by weight of a member selected from the group consisting of acrylic acid and methacrylic acid, and (3) up to about 98% by weight of at least one monomer selected from the group consisting of ($C_1$-$C_{24}$) alkyl methacrylates and ($C_1$-$C_{24}$) alkyl acrylates, the combination of alkyl methacrylates and alkyl acrylates being selected to provide a $T_g$ in the polymer of up to about −10° C.

3. The composition of claim 2 wherein the curing agent comprises a dicarboxylic acid bis-hydrazide represented by the formula, $H_2N—NH—C(O)—R—C(O)—NH—NH_2$, wherein R is the divalent polymethylene group having from 0 to 34 carbon atoms.

4. The composition of claim 1 wherein the emulsion polymer comprises a heteropolymer containing from about 30% to about 60% by weight resin solids, the particles of which comprise (a) about 50 parts to 95 parts by weight of a first polymer having a $T_g$ of up to −20° C. formed by emulsion polymerization of a first monomer mixture comprising (1) from about 0.25% to about 10% by weight of a polymerizable aldehyde selected from the group consisting of methacrolein and acrolein, (2) from about 0.5% to about 10% by weight of at least one α,β-ethylenically unsaturated carboxylic acid, and (3) up to about 99.25% by weight of at least one copolymerizable mono-ethylenically unsaturated monomer; and (b) about 5 parts to 50 parts by weight of a second polymer having a $T_g$ of about 100° C. to about −10° C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

5. The composition of claim 4 wherein the first polymer of the heteropolymer comprises units from methacrolein, a α,β-ethylenically unsaturated carboxylic acid selected from the group consisting of acrylic acid and methacrylic acid, and at least one monomer selected from the group consisting of ($C_1$-$C_{24}$) alkyl methacrylates and ($C_1$-$C_{24}$) alkyl acrylates, and the second polymer comprises at least one monomer selected from the group consisting of ($C_1$-$C_8$) alkyl methacrylates, styrene and alkyl-substituted styrenes, and (meth)acrylonitrile, and the curing agent comprises a dicarboxylic acid bis-hydrazide represented by the formula, $H_2N—NH—C(O)—R—C(O)—NH—NH_2$, wherein R is a divalent polymethylene group having from 0 to 34 carbon atoms.

6. A crosslinked coating composition carried on or in a flexible substrate obtained by the ambient or low-temperature curing of the composition of claim 1.

7. A crosslinked coating composition carried on or in a flexible substrate obtained by the ambient or low-temperature curing of the composition of claim 3.

8. A crosslinked coating composition carried on or in a flexible substrate obtained by the ambient or low-temperature curing of the composition of claim 5.

9. An article of manufacture comprising a flexible substrate, selected from the group consisting of leather and leather substitutes, treated with the ambient or low-temperature cured composition of claim 1.

10. An article of manufacture comprising a flexible substrate, selected from the group consisting of leather and leather substitutes treated with the ambient or low-temperature cured composition of claim 3.

11. An article of manufacture comprising a flexible substrate, selected from the group consisting of leather and leather substitutes, treated with the ambient or low-temperature cured composition of claim 5.

12. A process comprising treating a flexible material selected from the group consisting of leather and a leather substitute material with the composition of claim 1, and air-drying and curing the composition at ambient or low temperature on said material.

13. A process for producing an improved fully finished flexible material selected from the group consisting of leather and a leather substitute material comprising the steps of:

a. applying to the flexible material at least one first finish coat which consists of a soft, flexible, resinous binder which may optionally contain pigment and drying the resulting first finish coated material;

b. applying to the dried first finish coated material at least one second, plate or embossing coat and drying the second plating coated material;

c. applying to the dried first and second-coated material a third color coat comprising a film-forming acrylic polymer containing pigment dispersed therein and drying the third color coated material; and d. applying to the dried first and second and third-coated material a fourth top coat comprising an ambient or low-temperature curable composition comprising an aqueous dispersion of (1) an emulsion polymer having a plurality of reactive aldehyde groups and (2) a curing agent having a plurality of a member selected from the group consisting of hydrazide groups, represented by the formula $H_2N—NH—C(O)—$, and hydrazone groups, represented by the formula $R^1R^2C=N—NH—C(O)—$, wherein $R^1$ and $R^2$ are selected from the group consisting of H and alkyl groups, the ratio of hydrazide groups or of hydrazone groups to aldehyde groups of the polymer in the dispersion being from about 1:2 to 2:1, and drying the fourth top coated material.

14. The process of claim 13 wherein the fourth top coat comprises an ambient or low-temperature curable composition comprising an aqueous dispersion of:

a. an emulsion polymer containing from about 1% to about 60% by weight resin solids polymerized from a monomer mixture comprising (1) from about 0.25% to about 10% by weight of a polymerizable aldehyde selected from the group consisting of methacrolein and acrolein, (2) from about 0.5% to about 10% by weight of at least one α,β-ethylenically unsaturated carboxylic acid, and (3) up to about 99.25% by weight of at least one copolymerizable mono-ethylenically unsaturated monomer selected from the group consisting of ($C_1$-$C_{24}$) alkyl methacrylates, ($C_1$-$C_{24}$) alkyl acrylates, vinylidene halides, vinyl halides, (meth)acrylonitrile, vinyl esters, ethylene and alpha-olefins, acrylic and methacrylic acid esters of alcoholethers, vinyl ethers, styrene and alkyl-substituted styrenes and vinyl aromatics, the combination of monomers being selected to provide a $T_g$ in the polymer of up to about 0° C.; and b. a curing agent comprising a member selected from the group consisting of a dicarboxylic acid bishydrazide represented by the formula, $H_2N$—NH—C(O)—R—C(O)-NH-$NH_2$, and a dicarboxylic acid bis-hydrazone represented by the formula $R^1R^2C$=N—NH—C(O)—R—C(O)—NH—N=$CR^1R^2$, wherein R is a member selected from the group consisting of a divalent polymethylene group having from 0 to 34 carbon atoms and a divalent aromatic ring and $R^1$ and $R^2$ are selected from the group consisting of H and alkyl groups, the amount of bis-hydrazide or bis-hydrazone being selected to provide a ratio of hydrazide or of hydrazone groups to aldehyde groups of the polymer in the dispersion of from about 1:2 to 2:1.

15. The process of claim 13 wherein the fourth top coat comprises an ambient or low temperature curable composition comprising an aqueous dispersion of:

a. an emulsion polymer containing from about 30% to 60% by weight resins solids polymerized from a monomer mixture comprising (1) from 1% to 7.5% by weight of methacrolein, (2) from about 1% to about 7% by weight of a member selected from the group consisting of acrylic acid and methacrylic acid, and (3) up to about 98% by weight of at least one monomer selected from the group consisting of ($C_1$-$C_{24}$) alkyl methacrylates and ($C_1$-$C_{24}$) alkyl acrylates, the combination of ($C_1$-$C_{24}$) alkyl methacrylates and ($C_1$-$C_{24}$) alkyl acrylates being selected to provide a $T_g$ in the polymer of up to about −10° C.; and a curing agent comprising a dicarboxylic acid bishydrazide represented by the formula, $H_2N$—NH—C(O)—R—C(O)—NH—$NH_2$, wherein R is a divalent polymethylene group having from 0 to 34 carbon atoms, the amount of bis-hydrazide being selected to provide a ratio of hydrazide groups to aldehyde groups of the polymer in the dispersion of from about 1:2 to 2:1.

16. The process of claim 13 wherein the fourth top coat comprises an ambient or low temperature curable composition comprising an aqueous dispersion of:

a. an emulsion polymer comprising a heteropolymer containing from about 30% to about 60% by weight resin solids, the particles of which comprise (1) about 50 parts to 95 parts by weight of a first polymer having a $T_g$ of up to −20° C. formed by emulsion polymerization of a first monomer mixture comprising (a) from about 0.25% to about 10% by weight of methacrolein, (b) from about 0.5% to about 10% by weight of a member selected from the group consisting of acrylic acid and methacrylic acid, and (c) up to about 99.25% by weight of at least one copolymerizable monoethylenically unsaturated monomer; and (2) about 5 parts to 50 parts by weight of a second polymer having a $T_g$ of about 100° C. to about −10° C. formed by emulsion polymerization, in the presence of the first polymer, of second monomer mixture comprising at least one copolymerizable mono-ethylenically unsaturated monomer, the sum of the parts in the first monomer mixture and the second monomer mixture always being 100 parts by weight; and b. a curing agent comprising a dicarboxylic acid bishydrazide represented by the formula $H_2N$—NH—C(O)—R—C(O)—NH—$NH_2$, wherein R is a divalent polymethylene group having from 0 to 34 carbon atoms, the amount of bis-hydrazide being selected to provide a ratio of hydrazide groups to aldehyde groups of the polymer in the dispersion of from about 1:2 to 2:1.

17. An article of manufacture produced by the process of claim 13.

18. An article of manufacture produced by the process of claim 14.

19. An article of manufacture produced by the process of claim 15.

20. An article of manufacture produced by the process of claim 16.

21. The process of claim 13 wherein at least one member selected from the group consisting of the first finish coat and the second plate coat comprises at least one coat comprising an aqueous dispersion of an emulsion heteropolymer containing from about 30% to about 50% by weight resin solids, the particles of which comprise (1) about 50 parts to 95 parts by weight resin solids of a first polymer having a $T_g$ of up to and including about −10° C. formed by emulsion polymerization of a first monomer mixture comprising at least one member selected from the group consisting of ($C_1$-$C_{24}$) saturated and unsaturated alkyl methacrylates, ($C_1$-$C_{24}$) saturated and unsaturated alkyl acrylates, methacrylic acid, acrylic acid, styrene and alkyl styrenes, vinyl aryl compounds, vinyl halides and vinylidene halides, acrylonitrile, methacrylonitrile, hydrocarbons such as α-olefins and β-acryloxypropionic acid, and (2) about 5 parts to 50 parts by weight of a second polymer having a $T_g$ of greater than and including about 20° C. formed by emulsion polymerization, in the presence of the first polymer, of a second monomer comprising at least one member selected from the group consisting of ($C_1$-$C_4$) alkyl methacrylates, ($C_1$-$C_4$) alkyl acrylates, methacrylic acid, acrylic acid, styrene and alkyl styrenes, vinyl aryl compounds, vinyl halides and vinylidene halides, acrylonitrile, methacrylonitrile, hydrocarbons such as α-olefins, and β-acryloxypropionic acid, the sum of the parts in the first monomer mixture and the second monomer mixture aways being 100 parts by weight.

22. The process of claim 13 wherein at least one member selected from the group consisting of the first finish coat, the second plate coat, and the third color coat comprises an aqueous emulsion heteropolymer containing from about 30% to about 60% by weight resin solids comprising (a) about 50 parts to 95 parts by weight of a first polymer having a $T_g$ of up to −20° C. formed by emulsion polymerization of a first monomer mixture comprising (1) from about 0.25% to about 10% by weight of a polymerizable aldehyde selected from the group consisting of methacrolein and acrolein, (2) from about 0.5% to about 10% by weight of at least one α,β-ethylenically unsaturated carboxylic acid selected from the group consisting of acrylic acid and methacrylic acid, and (3) up to about 99.25% by weight of at least one copolymerizable mono-ethylenically unsaturated monomer; and (b) about 5 parts to about 50 parts by weight of a second polymer having a $T_g$ of about 100° C. to about −10° C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

23. The process of claim 13 wherein at least one member selected from the group consisting of the first finish coat, the second plate coat, and the third color coat comprises at least one coat comprising a blend, in a 1:10 to 10:1 weight ratio, of (1) an aqueous dispersion of an emulsion heteropolymer containing about 30% to about 50% by weight resin solids comprising (a) about 50 parts to about 95 parts by weight resin solids of a first polymer having a $T_g$ up to and including about −10° C. formed by emulsion polymerization of a first monomer mixture comprising at least one member selected from the group consisting of ($C_1$–$C_{24}$) saturated and unsaturated alkyl methacrylates, ($C_1$–$C_{24}$) saturated and unsaturated alkyl acrylates, methacrylic acid, acrylic acid, styrene and alkyl styrenes, vinyl aryl compounds, vinyl halides and vinylidene halides, acrylonitrile, methacrylonitrile, hydrocarbons such as α-olefins and β-acryloxypropionic acid, and (b) about 5 parts to 50 parts by weight of a second polymer having a $T_g$ of greater than and including about 20° C. formed by emulsion polymerization, in the presence of the first polymer, of a second monomer comprising at least one member selected from the group consisting of ($C_1$–$C_4$) alkyl methacrylates, ($C_1$–$C_4$) alkyl acrylates, methacrylic acid, acrylic acid, styrene and alkyl styrenes, vinyl aryl compounds, vinyl halides and vinylidene halides, acrylonitrile, methacrylonitrile, hydrocarbons such as α-olefins and β-acryloxypropionic acid, the sum of the parts of the first monomer mixture and the second monomer mixture always being 100 parts by weight; and (2) an aqueous dispersion of an emulsion polymer containing from about 30% to about 60% by weight resin solids comprising (a) about 50 parts to 95 parts by weight of a first polymer having a $T_g$ of up to −20° C. formed by emulsion polymerization of a first monomer mixture comprising (i) from about 0.25% to about 10% by weight of a polymerizable aldehyde selected from the group consisting of methacrolein and acrolein, (ii) from about 0.5% to about 10% by weight of at least one α,β-ethylenically unsaturated carboxylic acid, and (iii) up to about 99.25% by weight of at least one copolymerizable mono-ethylenically unsaturated monomer; and (b) about 5 parts to 50 parts by weight of a second polymer having a $T_g$ of about 100° C. to about −10° C. formed by emulsion polymerization, in the presence of the first polymer, of a second monomer mixture comprising at least one copolymerizable mono-ethylenically unsaturated monomer, the sum of the parts in the first monomer mixture and the second monomer mixture always being 100 parts by weight.

* * * * *

UNITED STATES PATENT AND TRADEMARK OFFICE
CERTIFICATE OF CORRECTION

PATENT NO. : 4,256,809

DATED : March 17, 1981

INVENTOR(S) : Bjorn E. Larsson and Fred A. Desiderio

It is certified that error appears in the above—identified patent and that said Letters Patent is hereby corrected as shown below:

Column 7, line 50, "$R^1R^2C=N-NH-C(O)-R-C(O)-NH-CR^1R^2$"

should be $--R^1R^2C=N-NH-C(O)-R-C(O)-NH-N=CR^1R^2--$.

Column 9, line 27, "60 ml." should be --600ml.--.

Column 17, line 46, "a" should be ---b.  a--- and the remainder of the line should be shifted to the right beginning below the furthest indentation in claim 15.

Signed and Sealed this

Twenty-fourth Day of August 1982

[SEAL]

Attest:

Attesting Officer

GERALD J. MOSSINGHOFF

Commissioner of Patents and Trademarks